Sept. 2, 1941. E. S. CORNELL, JR 2,254,566
FLEXIBLE COUPLING
Filed Aug. 27, 1938
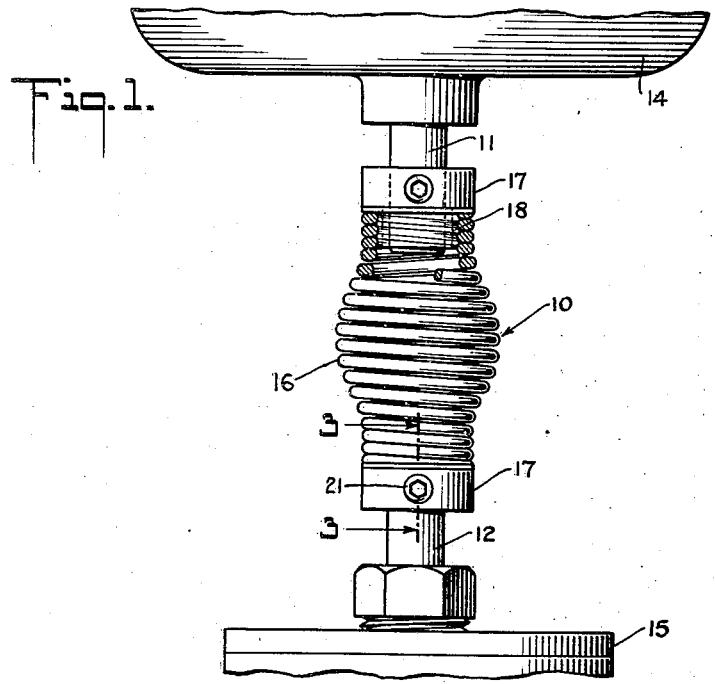
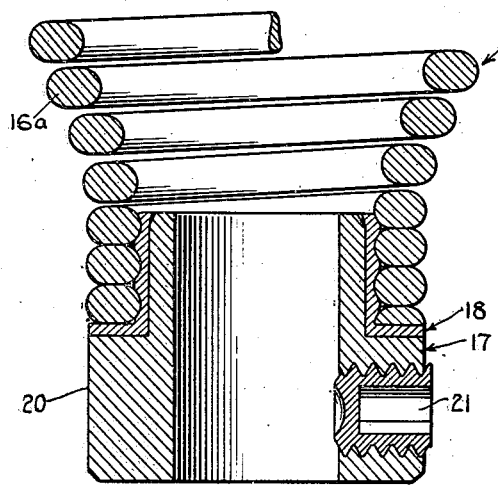
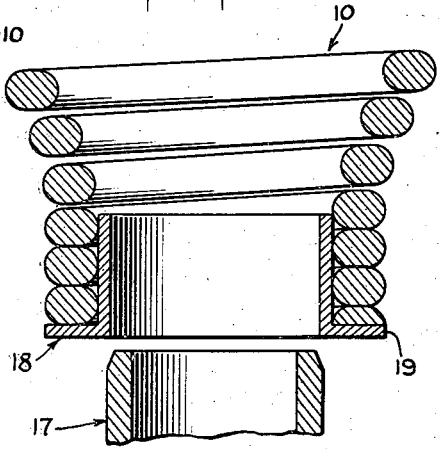
INVENTOR
Edward S. Cornell, Jr.//
HIS ATTORNEY Patented Sept. 2, 1941

2,254,566

UNITED STATES PATENT OFFICE 2,254,566

FLEXIBLE COUPLING

Edward S. Cornell, Jr., Larchmont, N. Y.

Application August 27, 1938, Serial No. 227,079

13 Claims. (Cl. 64—11)

This invention relates to flexible couplings.

In particular, the invention relates to flexible power-transmitting couplings, arranged to connect the rotating shafts of a driving and a driven machine, while preventing lack of accurate alignment of the respective shafts from imposing undue stress or pressure on the shaft bearings.

The invention has for a principal object, a flexible coupling having improved means for uniting a shaft-receiving bushing to such flexible coupling.

Also, an object of the invention is to provide means for uniting a shaft-receiving bushing to the body end-portions of a flexible coupling in a manner which affords positive engagement therewith without mutilating or otherwise weakening said body portions.

A further object of the invention is the provision of means for uniting a shaft-receiving bushing to a relatively non-yielding portion of the body of the coupling, in a manner utilizing the resistance to deformation of such portion to maximum degree.

Yet another object of the invention is the provision of a flexible coupling in which the shaft-receiving bushings thereof may be inserted, removed, or replaced, in the field, with the use merely of a screwdriver or pin, and a mallet, hammer or similar commonly available tool.

In a typical application of the present invention, the flexible coupling may comprise a coil spring having at each end a plurality of tightly wound relatively unyielding coils of substantially uniform coil diameter and an intermediate portion in which the coils of the spring are relatively widely separated to afford suitable flexibility.

The invention includes the employment of a pair of shaft-receiving bushings, provided with conventional set-screw means, and positioned in tight operative engagement with each of the coupling end portions by means of an intermediate bushing of a relatively soft, distortable, metallic material of slightly smaller internal diameter than the external diameter of the shaft-receiving bushing. When the latter bushing is driven into position within the intermediate bushing, the wall portion of the intermediate bushing is distorted and positively forced into apertures or groove formations provided at such coupling end portions thereby forming a positive union of said shaft-receiving bushing with the end portions of the body of the coupling.

Further features and advantages will hereinafter appear.

In the accompanying drawing—

Fig. 1 is an elevation, partly in section, representing the improved flexible coupling in operative position with respect to the shafts of a driving and a driven machine;

Fig. 2 is an enlarged sectional elevation showing the shaft-receiving bushing and the intermediate bushing prior to assembly; and Fig. 3 is an enlarged sectional elevation, taken on lines 3—3 of Fig. 1.

Referring to Fig. 1, the flexible coupling 10 forms the power-transmitting link between the shafts 11, 12, respectively, of a motor 14 and driven device 15. The invention finds particular application to machines of moderate power load and relatively high speed of rotation, and is especially suitable for installations in which the motor, for example, is resiliently mounted. Such resilient motor mounting may cause a relatively rapid vibratory displacement of its shaft from its preferred exact alignment with the shaft of the driven machine, and therefore, to prevent undue strain or bearing stress in either structure, a readily yieldable flexible coupling is desirably employed.

Referring now to Figs. 1 and 3, the flexible coupling includes a coil spring body element 16. The coils 16a thereof are substantially elliptical in cross-section, the major axis of the ellipse being substantially at right angles to the axis of rotation of the coupling. Such elliptical cross-section improves the efficiency of the power-transmission factor of the flexible coupling by increasing the resistance of the spring to diametric expansion. In practical effect, such increased resistance to expansion minimizes backlash and overthrow of the flexible coupling upon the starting and stopping of the motor element.

For any desired number of spring coils at each end of the spring body, the coils are tightly wound and are of uniform coil diameter; that is, the coils are very closely adjacent, and, desirably, in actual surface contact, one with the other. The central portion of the spring body may be "bellied" over any suitable radius, and within the limits of such central portion, the spring has a "free length"—that is, a length in which the spring coils are suitably spaced one from the other—for any desired number of coils. A satisfactory ratio of "free" coils to tight coils is of the order of three and one-half tightly wound coils at each end of the spring body, and ten and one-half "free" coils for the central portion of the spring body. Such disposition of "free" coils affords a satisfactory flexing of the coupling body.

For uniting the shaft-receiving bushings 17, 17 to the ends of the spring element in a manner which does not require any mutilation, such as pin or screw penetration, of the end portions of the coupling, there is provided a novel combination of elements, comprising a bushing 17 and a cooperating bushing 18 suitable for positioning intermediate the bushing 17 and the coupling end portions, as is shown in detail in Figs. 2 and 3.

The intermediate bushing 18, as indicated in Fig. 2, is formed with a relatively thin wall of relatively soft material, such as aluminum. The bushing has a flange portion 19, and for cooperation with said flange, the ends of the spring body 16 should be ground flat, and square to center line. The body of the bushing 18 may have a length substantially equal to the length of the end coil portion of the body, and desirably has an external diameter slightly in excess of the internal diameter of such tight coil portions of the body. The difference in the respective diameters may be of the order of .001 inch.

The shaft-receiving bushing 17 has a suitable flange or collar portion 20, the thickness of which is adequate for the reception of a suitable conventional set screw 21 for effecting actual shaft engagement. The diameter of the central bore of bushing 17 is as required for snug engagement with the respective shafts 11, 12.

The body portion or collar of the bushing 17 has a chamfered end, see Fig. 2, and the outer diameter of such body portion is slightly in excess of the inside diameter of the bushing 18. In practice, such difference in diameter may be of the order of .008 inch.

In assembling the bushings 17, 18 for effecting the power transmitting union of the bushing 17 with the coil spring body 16, the bushing 18 is first forced into the respective end portion of the spring body, as indicated in Fig. 2. Thumb pressure is adequate to effect such insertion. Then, by inserting the chamfered end of the bushing 17 into the annular opening of the bushing 18, such bushing 17 may be driven into engagement with the inner side walls of the bushing 18. Because of the relative outside and inside diameters of the respective bushings, and the substantially unyielding character of the tightly wound end portions of the spring body 16, the wedging action of the chamfered end during the forcing of the bushing 17 into engagement with the bushing 18 causes a distortion of the side wall of the bushing 18 and drives it into tight frictional engagement with the inner portions of the spring coils. An actual plastic deformation of the wall material of bushing 18 has been found, and the combined action of the frictional engagement of the bushings 17 and 18, and the displacement of the metal of the latter bushing into the interstices between the coils of the spring end portions provides an engagement of the bushing 17 with the bushing 18 and of the bushing 18 with the spring coils 16 which is capable of transmitting an apreciable power load without slippage. The wall of the bushing 18 becomes "work hardened" by such mechanical deformation.

As above stated, the elliptical section of the coils 16a substantially increases the resistance thereof to diametric expansion. Upon the assembly of the bushings 17, 18 within the end portions of the spring body 16, diametric expansion, in some degree, must inevitably occur; the reaction to such expansion exerts a compression force and increases the coefficient of frictional engagement of the coils 16a with the bushing 18 and the engagement of the latter with the bushing 17.

The material of the bushing 17, and the wall thicknesses thereof, should be such as will resist any tendency to collapse or otherwise distort during the stage of driving the bushing into frictional engagement with bushing 18. A relatively hard material is preferable for the bushing 17; a hard brass, or a nickel cast iron, serves adequately, and in addition, is substantially immune from atmospheric corrosion.

Should it be desired at any time to remove the bushing 17 for replacement thereof or for replacement of the bushing 18, such bushing 17 may be removed by driving it outwardly by means of a mallet and a suitable drive pin or equivalent. Upon the removal of the bushing 17, the bushing 18 is readily removed by collapsing it with a screw driver or other suitable tool. The replacement bushing 18 may then be inserted and the two bushings reassembled in the manner described above.

Although the invention has been described with particular reference to a flexible coupling of the coil spring type, it will be obvious that it is not limited to such form, nor to any particular method of effecting the engagement of the shaft-receiving elements thereof.

I claim:

1. A flexible coupling comprising, in combination, a central flexible body portion, annular end portions, and means for securing a shaft or equivalent to each of said end portions, said means including for cooperation with one of said end portions a plurality of bushings, one of said bushings being in frictional engagement with said end portion and with the other of said bushings.

2. A flexible coupling comprising, in combination, a central flexible body portion, annular end portions integral therewith, and means for securing a shaft or equivalent to each of said end portions, said means including for cooperation with one of said end portions a plurality of bushings, one of said bushings arranged to maintain the other of said bushings in frictional engagement with said end portion.

3. A flexible coupling comprising, in combination, a central flexible body portion, annular end portions resistant to diametric expansion, and means for securing a shaft to each of said end portions, said means including, at each end portion, a plurality of bushings in mutual operative association, one of said bushings being deformed by another of said bushings to effect a frictional engagement with said rigid end portion.

4. A flexible coupling comprising, in combination, a central flexible body portion, annular end portions associated therewith and resistant to diametric expansion, said end portions having a grooved internal wall, and means for securing shaft means to said end portions, said means comprising a bushing having a distortable wall disposed adjacent said grooved end portion, and shaft receiving means for distorting said bushing wall to effect a frictional engagement with said wall and the said grooves thereof.

5. A flexible coupling comprising, in combination, a spring forming the body of said coupling, the coils of said spring being in close contact with each other at the end portions of said body and spaced one from the other intermediate said end portion, and means for uniting a shaft or equivalent to an end portion of said spring body, said means including a bushing having a distortable wall portion adjacent said spring end portions and wedging means embodying shaft receiving means forced into wall-to-wall contact with said first mentioned bushing to urge the bushing wall into intimate contact with said coupling end portion.

6. A flexible coupling comprising, in combination, a coil spring forming the body of said coupling, the coils at the end portions of said coupling body being so wound as to form a substantially solid wall of substantially uniform diameter, and means for securing a shaft to said end portions, said means comprising a bushing having a relatively thin wall of relatively soft material positioned within said end portion and in contact with the side wall thereof, and a bushing having a wall of initially greater external diameter than the internal diameter of the wall of said first mentioned bushing forced into wall-to-wall contact therewith.

7. A flexible coupling comprising, in combination, a coil spring forming the body of said coupling, the coils at the end portions of said coupling body wound to form a substantially solid wall of substantially uniform diameter, said coil spring wound from spring material of substantially elliptical cross section, the major axis of said ellipse being substantially at right angles to the longitudinal axis of said coupling, and means for securing a shaft to said end portions, said means including an insert having a wall positioned within said end portion and in contact with the side wall thereof, an opening formed in said insert, and means for expanding the wall of said insert into tight frictional engagement with said coupling wall, said expanding means comprising a bushing having shaft-securing means associated therewith.

8. A flexible coupling comprising, in combination, a coil spring forming the body of said coupling, the coils at the end portions of said coupling body wound to form a substantially solid wall of substantially uniform diameter, said coil spring wound from spring material of substantially elliptical cross section, the major axis of said ellipse being substantially at right angles to the longitudinal axis of said coupling, and means for securing a shaft to said end portions, said means including an insert having a wall positioned within said end portions and in contact with the side wall thereof, an opening formed in said insert, and means for expanding the wall of said insert into tight frictional engagement with said coupling wall over an area greater than the initial area of contact of said insert wall with said coupling end wall, said expanding means comprising a bushing having a central opening arranged to receive said shaft and means for securing said bushing to said shaft.

9. In a flexible coupling having end portions stiffly resistant to diametric expansion and a flexible body portion, means for securing shafting or the like to the end portions thereof, said means including the combination with a bushing having a relatively thin wall of relatively soft metal, of a bushing having a relatively heavy wall of relatively hard metal, said latter bushing having an external wall diameter greater than the internal wall diameter of the first mentioned bushing.

10. In a flexible coupling having relatively inflexible end portions and a flexible body portion, means for securing shafting or the like to the end portions thereof, said means including the combination with a bushing having a relatively thin wall of relatively soft metal, of a bushing having a relatively heavy wall of relatively hard metal, said latter bushing having an external wall diameter of the order of eight thousandths of an inch greater than the internal wall diameter of the first mentioned bushing.

11. The method of affixing a shaft receiving means to a flexible coupling having an annular wall of relatively non-yielding material, comprising inserting a bushing having a relatively thin wall of relatively soft material in intimate contact with the inner surface of said annular wall, and forcibly inserting a bushing having shaft-securement means into the first mentioned bushing, said latter bushing having an external wall diameter greater than the internal wall diameter of the first mentioned bushing.

12. A flexible coupling, comprising, in combination, a flexible body portion and means for securing a shaft to an end of said body portion, said means including a sleeve adapted to be expanded into frictional engagement with the internal wall of said end portion, and an inner bushing operatively associated with said sleeve in wall to wall engagement therewith, said inner bushing, prior to such operative association, having an outer diameter greater than the inner diameter of said sleeve.

13. A flexible coupling comprising, in combination, a central flexible body portion, substantially inflexible end portions, and means for securing a shaft to each of said end portions, said means including a bushing adapted to be expanded into frictional engagement with one of said end portions, and shaft-engaging means insertable into said bushing for effecting such expansion.

EDWARD S. CORNELL, Jr.